United States Patent [19]

Robache

[11] 4,164,052

[45] Aug. 14, 1979

[54] SELF-PROPELLED APPARATUS FOR CLEANING BEETS

[75] Inventor: André Robache, Feucherolles, France

[73] Assignee: Fives-Cail Babcock, Paris, France

[21] Appl. No.: 890,994

[22] Filed: Mar. 28, 1978

[51] Int. Cl.² .................................... A23N 13/00
[52] U.S. Cl. ......................... 15/3.11; 209/673
[58] Field of Search ............. 15/3.11; 209/73, 74 R, 209/107

[56] References Cited

U.S. PATENT DOCUMENTS

| | | | |
|---|---|---|---|
| 2,307,257 | 1/1943 | Davis | 209/107 |
| 2,624,458 | 1/1953 | Molnau | 209/107 |
| 3,835,997 | 9/1974 | Hartmann | 209/73 |

FOREIGN PATENT DOCUMENTS 2191522  1/1974  France .................. 15/3.11

Primary Examiner—Edward L. Roberts
Attorney, Agent, or Firm—Kurt Kelman

[57] ABSTRACT

A self-propelled apparatus for cleaning beets comprises a longitudinally extending frame carrying a hopper for receiving beets to be cleaned which is mounted on a raised platform on the frame and is provided with a conveyor for delivering beets to a screen for scraping away the dirt from the beets, said screen extending longitudinally relative to the frame, and a conveyor for discharging the dirt scraped away from the beets which extends longitudinally beneath the screen and the hopper, the arrangement being such that, in use, the cleaned beets and the dirt are discharged at opposite ends of the frame.

8 Claims, 4 Drawing Figures

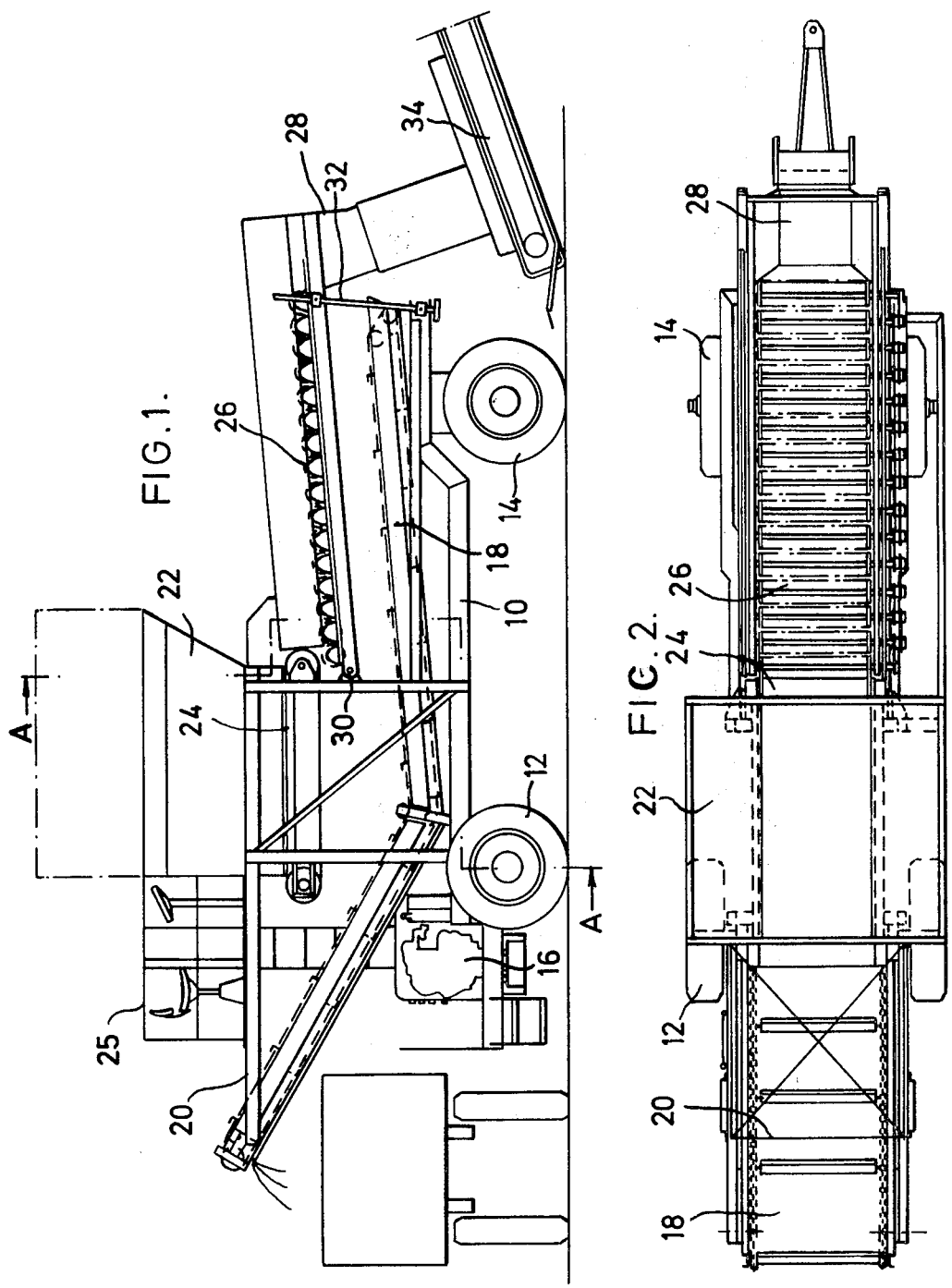

SELF-PROPELLED APPARATUS FOR CLEANING BEETS

The present invention relates to improvements in a self-propelled apparatus for cleaning sugar beets in the field, comprising a frame mounted on wheels and carrying a hopper for receiving beets to be cleaned, a screen for scraping away the dirt from the beets and a dirt discharge conveyor positioned beneath the screen.

In a known apparatus of this type, the screen forms the bottom of the hopper and supports the entire weight of the beets contained therein. The screen, which is generally constituted by a series of rollers arranged in a plane and formed each of helical springs tensioned between two side plates, is not designed for supporting heavy loads and does not work efficiently under these conditions.

An object of the present invention is to provide an apparatus which promotes efficient cleaning of the beets and which facilitates the loading of the cleaned beets and of the dirt onto vehicles.

According to the present invention, the hopper is mounted on a raised platform of the frame and provided with a conveyor for conveying beets from the hopper to the screen, the screen extends longitudinally relative to the frame, on one side of the hopper, and the dirt-discharging conveyor is disposed longitudinally beneath the screen and the hopper, the arrangement being such that, in use, the cleaned beets and the dirt are discharged at opposite ends of the frame.

The screen is preferably mounted on the frame in such a way that its inclination may be modified. The rearward portion of the discharge conveyor is preferably raised for the purpose of discharging dirt onto a vehicle.

By suitably and selectively regulating the rate of delivery of the beet conveyor, the inclination of the screen and, possibly, the speed of rotation of the rollers of the screen, it is possible to maintain on the screen the best possible load to produce maximum efficiency. Moreover, the discharge of the beets and of the dirt at the opposite ends of the apparatus facilitates the positioning of the vehicles on to which they are loaded.

The filling of the hopper can be effected by means of an independent loader. It is also possible to employ a loading device which is incorporated in the apparatus and is mounted on the platform. This device may comprise a skip or grab bucket carried by a pivotable arm mounted for pivotal movement on the platform by means of a roller bearing having a vertical axis of rotation. It may also be formed by a liftable and adjustable jib provided at its end with a loading fork or grab and carrying an elevator permitting the beets collected by the grab or the fork to be transported to the hopper, the end of the jib resting on the platform adjacent an upper rim of the hopper. The jib may be mounted for rotation relative to the platform by means of a roller bearing having a vertical axis of rotation.

For the loading of the cleaned beets, there is used an elevator which may be independent or may be incorporated in the apparatus of the present invention and provided with a hopper receiving the beets which leave the screen or sieve. The bottom of this hopper is advantageously formed by rotatable transport rollers which are similar to those of the screen so as to regulate the rate of feeding of beets to the elevator.

The above and other objects, advantages and features of the present invention will become more apparent from the following detailed description of a now preferred embodiment thereof, taken in conjunction with the accompanying drawings in which:

FIG. 1 is a side elevation of a self-propelled apparatus for cleaning beets;

FIG. 2 is a plane view of apparatus of FIG. 1;

Figure 3:
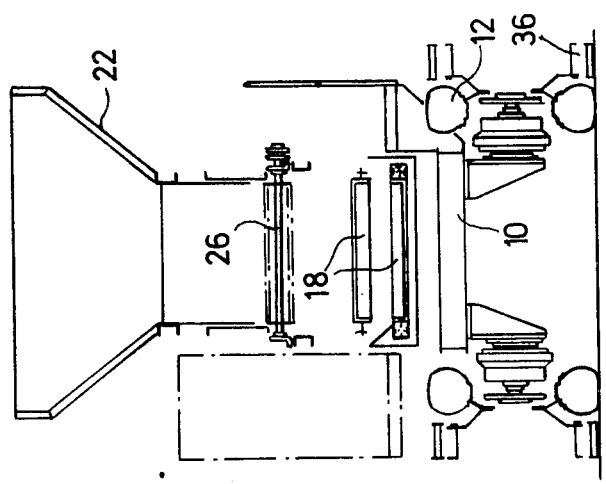
FIG. 3 is a section along the line A—A of FIG. 1.

The apparatus which is illustrated in FIGS. 1 to 3 comprises a frame 10 mounted on two driving wheels 12 and two steering wheels 14. This frame carries a diesel engine 16 for driving the wheels 12 and other drivable elements of the apparatus by hydraulic means. It also carries a discharge conveyor 18 for discharging dirt and constituted by a channel, along the bottom of which are arranged dirt displacement scrapers fixed to two endless chains for movement along the channel. These chains pass about pinions, not shown, which are arranged to be driven by a manually controlled variable speed hydraulic motor.

This conveyor 18 is disposed longitudinally of the frame and comprises a part which is slightly inclined downwardly in the intended direction of conveyance, followed by a steeply upwardly inclined part which permits the dirt to be loaded on to lorries or trailers.

The frame 10 comprises an upper platform 20 which supports a feed hopper 22 and a belt conveyor 24 positioned beneath the hopper 22; this conveyor is arranged to be driven by a manually controlled variable speed hydraulic motor for controlling the rate of delivery of the beets from the hopper. The platform 20 also carries the driving seat and controls 25 of the apparatus and supports the upper end of the conveyor 18.

A screen 26 for separating the dirt from the sugar beets is situated above the front end of the conveyor 18 and underneath the discharge end of the conveyor 24. This screen is formed by a series of parallel rollers which are rotatable about horizontal axes and so arranged as to form a conveyor. In use, the screen 26 is supplied with beets at a controlled rate by the conveyor 24 and brings the beets up to a chute 28 which is provided at the other end of the screen 26. The conveyor rollers are each formed by a shaft having two end plates or flanges, on which are fixed resilient bars or rails, formed for example by helical springs tensioned between the side plates or flanges. They are mounted on a screen frame which is pivoted at its front end by means of a horizontal shaft 30 on posts which support the platform 20. At its other end, the screen is supported by two screw or hydraulic jacks 32, which permit the inclination of the screen to be regulated. The shafts of the rollers are provided with pinions which are connected by chains and a manually adjustable variable speed hydraulic motor permits the rollers to be driven at the desired speed.

Other beet cleaning screen arrangements of different types may be employed in place of the screen described.

In the example illustrated in FIGS. 1 to 3, the chute 28 feeds a belt-type elevator 34, which is mounted on wheels and can be connected to the apparatus for the necessary movements in the field. If desired, any type of elevator may be mounted on a liftable and adjustable beam which is carried by the chassis or frame 10.

The engine 16 drives a variable delivery pump with manual control of the rate of delivery. This pump feeds the hydraulic motors of the conveyor 18, of the conveyor 24 and of the screen 26; it may also feed a hydraulic motor forming part of the equipment of the elevator 34 or of a loading unit incorporated in the apparatus.

A distributor permits the pump to deliver working fluid to the hydraulic motors of the driving wheels for travel of the apparatus; during travel, the conveyor 18, the conveyor 24 and the screen 26 are stopped.

The steering wheels 14 are mounted on an axle pivotable on a ball-bearing ring gear and the steering is controlled by two jacks supplied with working fluid by the pump during travelling of the apparatus.

The apparatus is designed to move at a low speed, e.g. 5 km/h, and for rapid transport thereof, e.g. on the road, it may be towed by means of a detachable draw bar coupled to the steering axle. Chain pulleys 36 (FIG. 3) may be fixed on the hubs of the driving wheels for fitting chains to increase traction across muddy ground.

The beets to be cleaned are loaded into the hopper 22; they are then delivered to the screen 26 by the conveyor 24. On the screen, the rotation of the rollers causes displacements of the beets relatively to one another and simultaneously a movement of all the beets downstream. The friction of the beets relative to one another and on the rollers scrapes away the dirt therefrom, which falls through the rollers on to the conveyor 18 which delivers the dirt into lorries or trailers.

The cleaned beets fall through the chute 28 on to the conveyor belt of the elevator 34, which discharges them into a lorry or a trailer.

The time during which the beets remain on the screen can be varied by modifying the inclination of the latter, e.g. by means of screw jacks 32, and by varying the speed of rotation of the rollers.

Figure 4:
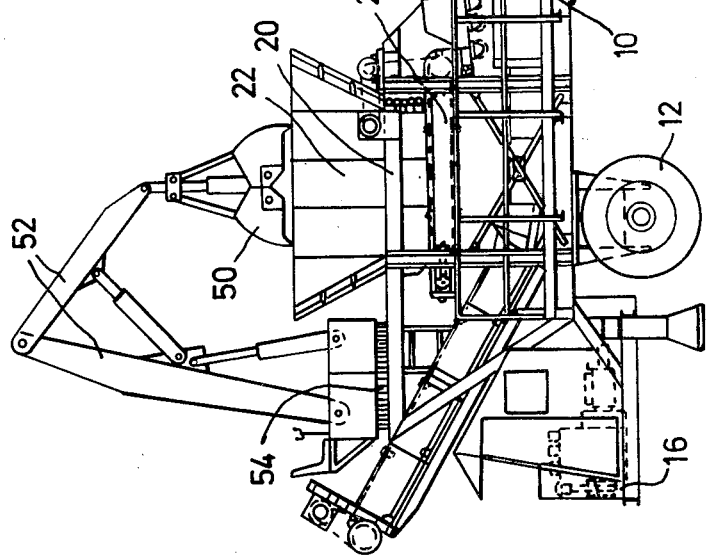
FIG. 4 is a side elevation of another apparatus according to the invention.

In the apparatus illustrated in FIG. 4, the chute 28 supplies an elevator 29 carried by a frame 40 mounted on the frame 10 of the apparatus by means of a ring gear with roller bearings, by means of which the elevator can be swung about a vertical axis; the elevator 29 is pivoted about a horizontal axis on the frame 40 and jacks 42 or other lifting means permit its inclination to be modified.

The chassis 40 carries a hopper 44, a base of which is formed by rotatable horizontal transport rollers 46, similar to those which are used on the screen 26. These rollers 46 bring the beets falling from the chute 28 to the base of the elevator 29 and regulate their rate of delivery; they are rotatably driven by a take off from a shaft of a lower drum of the elevator 29.

A loading device comprising a grab bucket 50 carried by a pivoted arm 52 is mounted on the platform 20 by means of a roller bearing 54, so that it may be swung about a vertical axis. The arm and the bucket are conventionally controlled by means of hydraulic jacks.

The loading device may also be formed by a jib carrying an elevator and provided at its bottom end with a shovel or a fork which is pivotable about a horizontal axis and is arranged to be operated by jacks. In such a case, the beam may be pivoted at its upper end on a roller bearing mounted on the platform 20 above the hopper 22, the top of the elevator being situated approximately on the axis of the ring gear.

In use, beets to be cleaned are taken up by the grab bucket 50, which discharges them into the hopper 22; they are then delivered to the screen 26 by the conveyor 24. On the screen, the dirt is scraped away from the beets and falls on to the conveyor 18, which loads it into lorries or trailers. The cleaned beets fall through the chute 28 on to the elevator 29, which loads them on to a lorry or trailer.

What is claimed is:

1. A self-propelled apparatus for cleaning beets in the field, comprising a longitudinally extending frame mounted on wheels and carrying a first hopper for receiving beets to be cleaned, a screen for cleaning the beets by scraping away the dirt therefrom and a discharge conveyor for dirt positioned beneath the screen, in which apparatus the hopper is mounted on a raised platform on the frame and is provided with a beet conveyor for conveying beets from the hopper to the screen, the screen extends longitudinally relative to the frame, on one side of the hopper, and the dirt-discharging conveyor is disposed longitudinally beneath the screen and the hopper, the arrangement being such that, in use, the cleaned beets and the dirt are discharged at opposite ends of the frame.

2. A self-propelled apparatus according to claim 1, including means for varying the angle to the horizontal of the screen.

3. A self-propelled apparatus according to claim 2, wherein an end of the screen adjacent the hopper is pivotable on the frame of the apparatus, about a horizontal shaft, and the other end of the screen is adjustable in height.

4. A self-propelled apparatus according to claim 1, wherein a downstream end of the dirt-discharging conveyor is raised for discharge of the dirt onto a vehicle.

5. A self-propelled apparatus according to claim 1, further comprising an elevator for the loading of the cleaned beets, provided with a second hopper for receiving beets leaving the screen, a base of the said second hopper being formed by rotatable transport rollers.

6. A self-propelled apparatus according to claim 1, further comprising a loading device mounted on the said platform for loading beet into the first hopper.

7. A self-propelled apparatus according to claim 6, wherein the loading device comprises a grab bucket carried by a pivotable arm mounted for rotation on the said platform by means of a roller bearing having a vertical axis.

8. A self-propelled apparatus according to claim 1 and including means for driving wheels of the apparatus, the beet conveyor, the screen, and the dirt discharging conveyor wherein said driving means includes a diesel engine, a variable delivery hydraulic pump and a plurality of hydraulic motors.

* * * * *